(12) United States Patent
Golly et al.

(10) Patent No.: US 10,613,112 B2
(45) Date of Patent: Apr. 7, 2020

(54) AIR DATA PROBE ASSEMBLY METHOD

(71) Applicant: Rosemount Aerospace Inc., Burnsville, MN (US)

(72) Inventors: Timothy Thomas Golly, Lakeville, MN (US); Paul Robert Johnson, Prior Lake, MN (US); Greg Seidel, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 176 days.

(21) Appl. No.: 15/875,618

(22) Filed: Jan. 19, 2018

(65) Prior Publication Data

US 2019/0227094 A1    Jul. 25, 2019

(51) Int. Cl.
*G01P 5/165* (2006.01)
*G01F 1/46* (2006.01)
*G01P 13/02* (2006.01)

(52) U.S. Cl.
CPC .............. *G01P 5/165* (2013.01); *G01F 1/46* (2013.01); *G01P 13/025* (2013.01)

(58) Field of Classification Search
CPC ........... G01P 5/156; G01P 13/025; G01F 1/46
USPC ....................................................... 73/866.5
See application file for complete search history.

(56) References Cited

U.S. PATENT DOCUMENTS

| | | |
|---|---|---|
| 3,400,584 A | 9/1968 | Beilman |
| 3,514,999 A | 6/1970 | Mejean et al. |
| 4,616,952 A * | 10/1986 | Schott ..................... F16D 1/116 403/316 |
| 5,483,839 A | 1/1996 | Meunier |
| 6,591,696 B2 | 7/2003 | Bachinski |
| 10,384,787 B2 * | 8/2019 | Gordon .................. B64D 15/12 |
| 2002/0157229 A1 * | 10/2002 | Feeley .................... G01P 5/165 29/402.08 |
| 2003/0010130 A1 * | 1/2003 | Bachinski ............... G01P 5/165 73/747 |
| 2004/0093953 A1 * | 5/2004 | Gilkison ................. G01P 5/165 73/736 |

(Continued)

FOREIGN PATENT DOCUMENTS

| WO | WO2013028220 A1 | 2/2013 |
|---|---|---|
| WO | WO2016135061 A1 | 9/2016 |

OTHER PUBLICATIONS

Extended European Search Report for European Patent Application No. 19152521.1, dated Jun. 21, 2019, 10 pages.

*Primary Examiner* — Nimeshkumar D Patel
*Assistant Examiner* — Jean F Morello
(74) *Attorney, Agent, or Firm* — Kinney & Lange, P.A.

(57) ABSTRACT

An air data probe includes a strut including a socket defining an interior surface of the strut and an interior groove extending radially into the interior surface. The air data probe also includes a probe head partially positioned within the socket, the probe head including an exterior surface and an exterior groove extending radially into the exterior surface, the exterior groove being axially alignable with the interior groove. The air data probe further includes a retaining ring partially positionable within the exterior groove and partially positionable within the interior groove when the exterior groove and the interior groove are axially aligned to axially retain the probe head to the strut while allowing the probe head to rotate relative to the strut.

20 Claims, 5 Drawing Sheets

(56) References Cited

U.S. PATENT DOCUMENTS

| | | | |
|---|---|---|---|
| 2008/0250884 A1* | 10/2008 | Braun | G01P 5/165 |
| | | | 73/866.5 |
| 2014/0130621 A1* | 5/2014 | Palassis | G01D 11/00 |
| | | | 73/866.5 |
| 2018/0259548 A1* | 9/2018 | Anderson | G01P 5/165 |

* cited by examiner

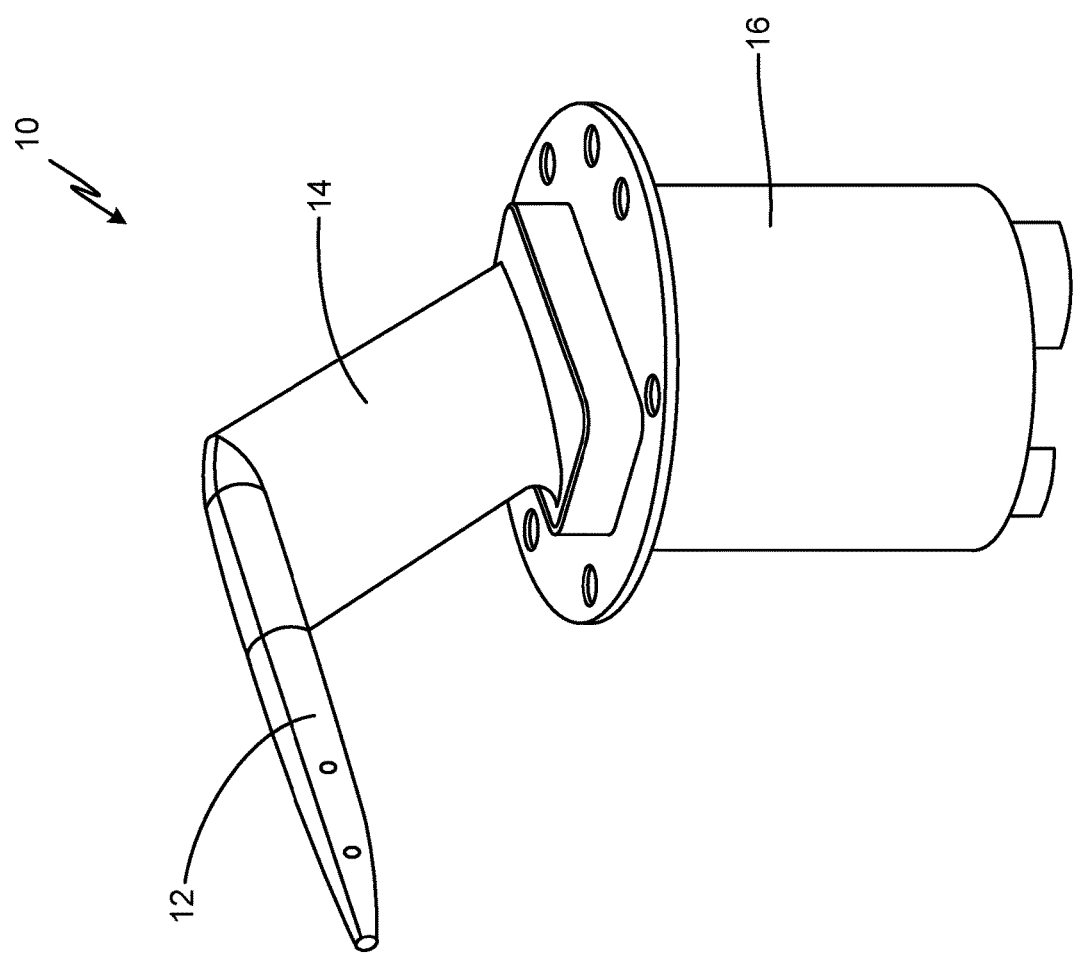

AIR DATA PROBE ASSEMBLY METHOD

BACKGROUND

The present disclosure relates generally to air data probes, and in particular, to probe heads and struts of air data probes.

Air data probes are installed on aircraft to gather pneumatic pressures that permit the measurement of air data parameters. Air data probes sample air pressure, at one or more locations along the probe, to permit measurement of pressures for generating air data parameters such as speed, altitude, and angle of attack. Air data probes sample air pressure at one or more locations along a probe head, which is attached to a strut. The probe head is often attached to the strut via brazing. It can be difficult to properly position the probe head within the strut prior to brazing.

SUMMARY

An air data probe includes a strut including a socket defining an interior surface of the strut and an interior groove extending radially into the interior surface. The air data probe also includes a probe head partially positioned within the socket, the probe head including an exterior surface and an exterior groove extending radially into the exterior surface, the exterior groove being axially alignable with the interior groove. The air data probe further includes a retaining ring partially positionable within the exterior groove and partially positionable within the interior groove when the exterior groove and the interior groove are axially aligned to axially retain the probe head to the strut while allowing the probe head to rotate relative to the strut.

A method for manufacturing an air data probe includes inserting a probe head into a socket of a strut, radially compressing a retaining ring positioned at an exterior groove of the probe head, aligning the exterior groove with an interior groove in the socket of the strut, radially expanding the retaining ring so that a portion of the retaining ring is positioned within the interior groove and a portion of the retaining ring is positioned within the exterior groove, locking the probe head to the strut, positioning a braze material in an annular gap defined between the probe head and the strut, and fixing the probe head to the strut.

BRIEF DESCRIPTION OF THE DRAWINGS

FIG. 1 is a perspective view of an air data probe.

DETAILED DESCRIPTION

Figure 2A:
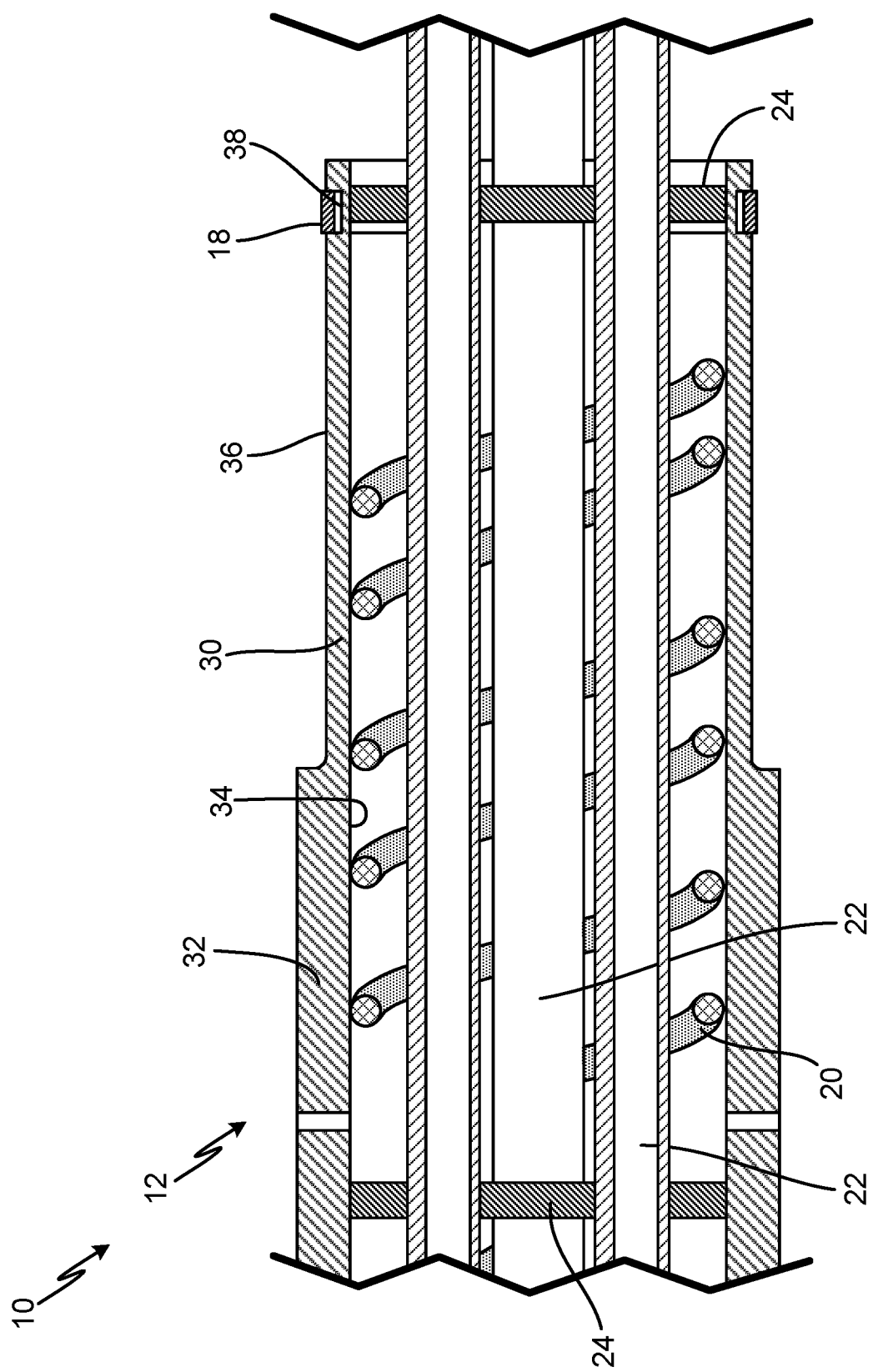
FIG. 2A is a partial cross-sectional view of a probe head of the air data probe.

In general, the present disclosure describes an air data probe that has a probe head with an exterior groove for holding a retaining ring and a strut with an interior groove for accepting the retaining ring. The retaining ring compresses when the probe head is inserted into the strut and, when it reaches the interior groove of the strut, expands partially into the interior groove to axially lock the probe head and the strut in place. As a result, the probe head is properly and precisely located within the strut, the manufacturing process is simplified, and the joint between the probe head and the strut is structurally superior.

FIG. 1 is a perspective view of air data probe 10. Air data probe 10 includes probe head 12, strut 14, and housing 16.

Probe head 12 is connected to a first end of strut 14. Probe head 12 is the sensing head of air data probe 10. Probe head 12 has one or more ports positioned in probe head 12. Internal components of air data probe 10 are located within probe head 12. A second end of strut 14 is connected to housing 16. As such, strut 14 connects probe head 12 to housing 16. Strut 14 is blade-shaped. Strut 14 may be a casting. Internal components of air data probe 10 are located within strut 14. Housing 16 may also contain internal components, such as sensors or other electronics, of air data probe 10. In alternate embodiments, air data probe 10 may not include housing 16.

Air data probe 10 is installed on an aircraft. Air data probe 10 may be mounted to a fuselage of the aircraft via fasteners, such as screws or bolts. Strut 14 holds probe head 12 away from the fuselage of the aircraft to expose probe head 14 to the oncoming airflow outside of the boundary layer. Probe head 12 takes in air from surrounding airflow via the one or more ports positioned in probe head 12. Air pressures from probe head 12 are communicated pneumatically through internal components of probe head 12 and strut 14 to reach internal components within housing 16. Pressure sensors and/or other components within housing 16, or elsewhere in the aircraft, measure the air pressures provided by probe head 12. Air data probe 10 uses the pressure measurements to generate air data parameters related to the aircraft flight condition, such as the speed, altitude, or angle of attack of the aircraft.

Figure 2B:
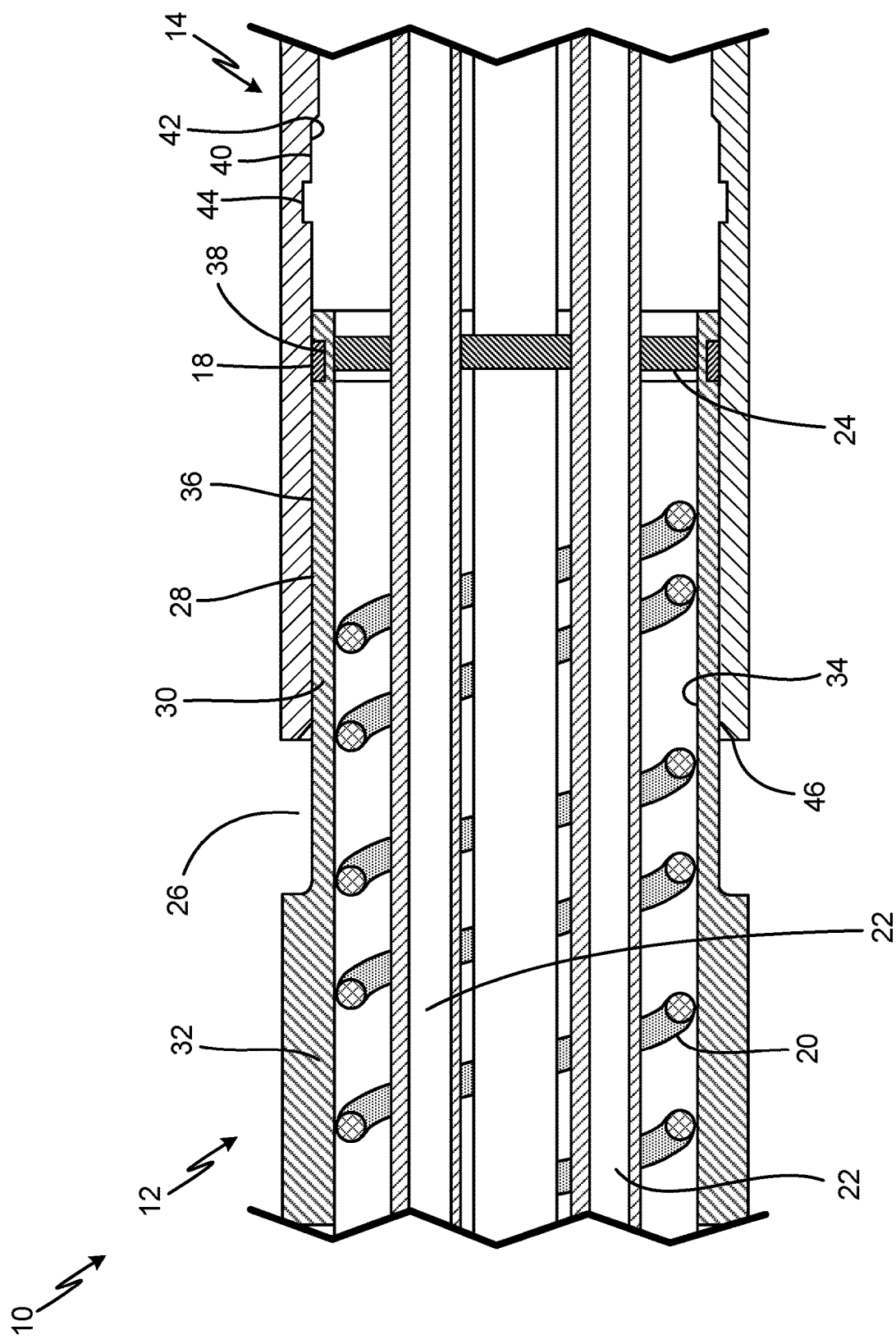
FIG. 2B is a partial cross-sectional view of the probe head partially inserted into a strut of the air data probe.
Figure 2C:
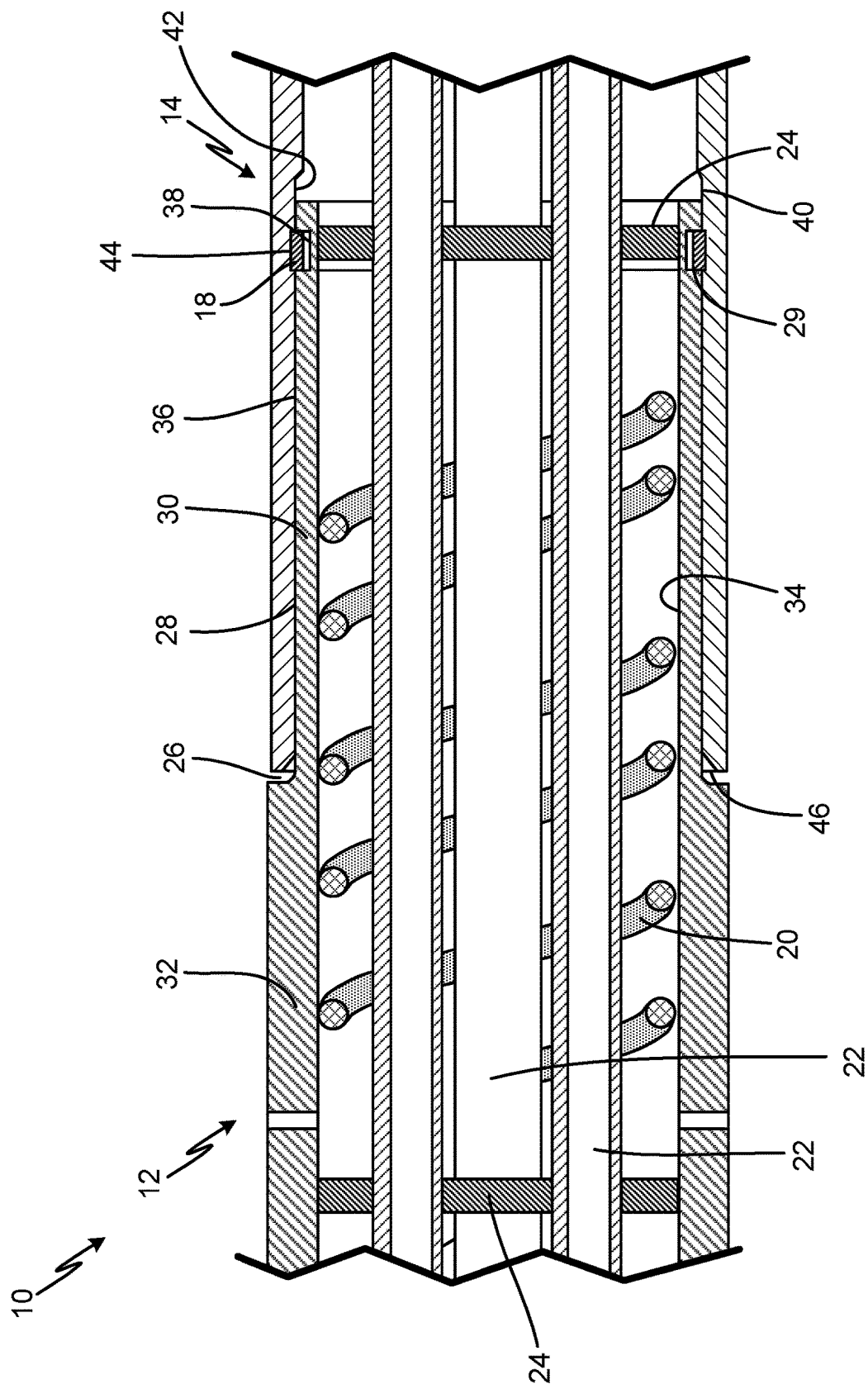
FIG. 2C is a partial cross-sectional view of the probe head fully inserted into the strut of the air data probe.

FIGS. 2A-2C illustrate the process for assembling probe head 12 to strut 14. FIG. 2A is a partial cross-sectional view of probe head 12 of air data probe 10. FIG. 2A shows probe head 12 before probe head 12 is inserted into strut 14. FIG. 2B is a partial cross-sectional view of probe head 12 partially inserted into strut 14 of air data probe 10. FIG. 2C is a partial cross-sectional view of probe head 12 fully inserted into strut 14 of air data probe 10. In FIG. 2C, probe head 12 is axially locked in place within strut 14 and is ready to be rotated into a final position and permanently bonded in place with braze.

FIGS. 2A, 2B, and 2C will be discussed together to describe the components of probe head 12 and strut 14. Air data probe 10 includes probe head 12, strut 14 (shown in FIGS. 2B and 2C), retaining ring 18, heater 20, pneumatic tubes 22, bulkheads 24, gap 26 (shown in FIGS. 2B and 2C), passageway 28 (shown in FIGS. 2B and 2C), and annular gap 29 (shown in FIG. 2C). Probe head 12 includes first portion 30, second portion 32, interior surface 34, exterior surface 36 and exterior groove 38. Strut 14 includes strut socket 40 (which has an interior surface 42), interior groove 44, and tapered edge 46.

Probe head 12 is hollow and substantially cylindrical. Probe head 12 is partially positioned within a first end of strut 14. Retaining ring 18 is positioned between probe head 12 and strut 14. Retaining ring 18 a hoop style ring and can compress radially from its free state. Heater 20 is coiled and positioned within the hollow portion of probe head 12. Heater 20 extends into strut 14 and housing 16 (shown in FIG. 1) where heater 20 may connect with an electrical component, such as a lead wire. Additionally, heater 20 may have a special connector on an end to keep it hermetically sealed. Pneumatic tubes 22 are hollow tubes positioned within the hollow portion of probe head 12. Pneumatic tubes 22 extend through a center space of coiled heater 20. Pneumatic tubes 22 also extend into strut 14 and housing 16 (shown in FIG. 1). Each pneumatic tube 22 may consist of multiple metal tubes connected together. Bulkheads 24 are positioned within the hollow portion of probe head 12. Bulkheads 24 are disk-shaped. Bulkheads 24 have openings for pneumatic tubes 22, or other internal components of probe head 12, to pass through bulkheads 24. Gap 26 is an axial gap, or space, between probe head 12 and strut 14. Passageway 28 is a radial gap between probe head 12 and strut 14. Annular gap 29 is defined between probe head 12 and strut 14. Gap 26, passageway 28, and annular gap 29 are filled with a braze material.

Probe head 12 has first portion (or mounting section) 30 connected to second portion 32. First portion 30 has a smaller outer diameter than second portion 32. Interior surface 34 is an annular inner surface of probe head 12. Bulkheads 24 positioned in the hollow portion of probe head 12 are in contact with interior surface 34. Exterior surface 36 is an annular outer surface of probe head 12. Exterior groove 38 is a groove, or annular channel, that extends radially into exterior surface 36 at first portion 30 of probe head 12. As shown in FIG. 2C, retaining ring 18 is partially positioned in exterior groove 38. As such, a radially inner portion of retaining ring 18 is within exterior groove 38, and a radially outer portion of retaining ring 18 is radially outward from exterior groove 38, and thus radially outward from exterior surface 36 of probe head 12. Exterior groove 38 is filled with a braze material. As seen in FIG. 2B, exterior groove 38 is dimensioned to allow retaining ring 18 to compress radially (from a free state) until retaining ring 18 is fully positioned within exterior groove 38, and a radially outer surface of retaining ring 18 is about flush with exterior surface 36 of probe head 12.

Strut 14 has strut socket 40 that accepts, or receives, probe head 12. Strut socket 40 is hollow and substantially cylindrical. Strut socket 40 is machined to precisely receive probe head 12. First portion 30 of probe head 12 is partially positioned within strut socket 40, as seen in FIG. 2C. Probe head 12 is rotatable within strut socket 40. Strut socket 40 defines interior surface 42 of strut 14. Interior surface 42 is an annular inner surface of strut socket 40. The radial gap between interior surface 42 and first portion 30 of probe head 12 that is positioned within strut socket 40 makes up passageway 28. Passageway 28 is filled with a braze material. Interior groove 44 is a groove, or annular channel, that extends radially into interior surface 42. Interior groove 44 has a square-shaped cross-sectional profile. As such, interior groove 44 has square edges, or substantially 90 degree edges. Exterior groove 38 is axially alignable with interior groove 44. In FIG. 2C, interior groove 44 is axially aligned with exterior groove 38. When axially aligned, exterior groove 38 and interior groove 44 form annular gap 29. Retaining ring 18 sits in annular gap 29. Retaining ring 18 is partially positioned in interior groove 44. As such, a radially outer portion of retaining ring 18 is within interior groove 44. Interior groove 44 is filled with a braze material. Strut 14 has tapered edge 46 at an end of strut socket 40 that receives probe head 14. At tapered edge 46, an inner portion of the end of strut socket 40 is angled. The axial gap between an end of strut 14 at tapered edge 46 and an end of second portion 32 of probe head 12 makes up gap 26.

During manufacturing of air data probe 10, exterior groove 38 is machined into first portion 30 of probe head 12 at exterior surface 36. Bulkheads 24, heater 20, pneumatic tubes 22, and any other internal components, which may be vacuum brazed together, are inserted into the hollow portion of probe head 12.

FIG. 2A shows probe head 12 before probe head 12 is inserted into strut socket 40. Retaining ring 18 is placed in, or mounted within, exterior groove 38. As seen in FIG. 2A, a radially inner portion of retaining ring 18 is within exterior groove 38, and a radially outer portion of retaining ring 18 is radially outward of exterior groove 38 such that the radially outer portion of retaining ring 18 is outward from exterior surface 36 of first portion 30 of probe head 12. Retaining ring 18 is in a free state and a space exists between a bottom surface of exterior groove 38 and an inner diameter of retaining ring 18. Interior groove 44 is machined into strut socket 40 at interior surface 42.

FIG. 2B shows probe head 12 being inserted into strut socket 40 with retaining ring 18 compressed. First portion 30 of probe head 12 is partially inserted into strut socket 40 of strut 14. As probe head 12 is inserted into strut 14, an edge of retaining ring 18 contacts tapered edge 46. Tapered edge 46 forces retaining ring 18 to radially compress into exterior groove 38 of probe head 12 as probe head 12 is further inserted into strut socket 40. Retaining ring 18 compresses until retaining ring 18 is fully positioned within exterior groove 38. Probe head 12 can be further inserted into strut socket 40 once retaining ring 18 is compressed. Gap 26 is larger when probe head 12 is only partially inserted in strut socket 40.

FIG. 2C shows probe head 12 advanced further into strut socket 40 such that exterior groove 38 and interior groove 44 are aligned, and retaining ring 18 is radially expanded to axially lock probe head 12 in place within strut 14. When probe head 12 is fully inserted, or at a proper depth, within strut socket 40 of strut 14, retaining ring 18 within exterior groove 38 reaches interior groove 44 of strut 14 and snaps from a compressed state to a semi-relaxed state. As a result, retaining ring 18 expands radially into interior groove 44 such that a radially outer portion of retaining ring 18 is positioned within interior groove 44 and a radially inner portion of retaining ring 18 remains positioned within exterior grove 38. As such, when retaining ring 18 snaps into place within air data probe 10, retaining ring 18 is partially positioned in exterior groove 38 of probe head 12 and partially positioned in interior groove 44 of strut 14. In this embodiment, an inner half of retaining ring is positioned in exterior groove 38 and an outer half of retaining ring 18 is positioned in interior groove 44. After retaining ring 18 radially expands, space remains in annular gap 29, such as between a bottom of exterior groove 38 and an inner diameter of retaining ring 18. Probe head 12 can be adjusted within strut 14 by rotationally adjusting and/or axially adjusting probe head 12 relative to strut 14. Probe head 12 is allowed to rotate relative to strut 14 to adjust the final position of probe head 12. Axial dimensions of retaining ring 18, exterior groove 38, and interior groove 44 are sized and shaped to allow some (generally a small amount) axial movement between probe head 12 and strut 14 to make small axial adjustments to probe head 12 within strut 14. Any other final adjustments, intermediate assembly, and testing can performed with probe head 12 held securely to strut 14. A braze material is inserted into passageway 28 at gap 26 until passageway 28 is filled with the braze material. The braze material is also positioned in annular gap 29. More specifically, braze material fills exterior groove 38 and interior groove 44 around retaining ring 18, such that no spaces remain in annular gap 29. Filling passageway 28 and annular gap 29 with braze material allows probe head 12 to be brazed to strut 14. Probe head 12 is brazed to strut 14 to rigidly join, or fix, probe head 12 to strut 14 in a final position. As such, probe head 12 is permanently bonded to strut 14.

Heater 20 prevents ice from accumulating on an exterior of air data probe 10 and keeps water out of an interior of air data probe 10. Pneumatic tubes 22 deliver one or more pneumatic pressures from probe head 12 to housing 16 (shown in FIG. 1) for use in generating the necessary air data parameters to be relayed to an aircraft flight control system. Bulkheads 24 separate air pressures obtained from different locations along probe head 12 into different chambers within probe head 12. Each chamber created by bulkheads 24 is connected to a different pneumatic tube 22 so that the correct pressure is pneumatically communicated to the correct pneumatic tube 22 and corresponding pneumatic output within air data probe 10.

Retaining ring 18 is partially positioned in exterior groove 38 of probe head 12 and partially positioned in interior groove 44 of strut 14 to axially retain, or axially lock, probe head 12 to strut 14. Probe head 12 is axially locked to strut 14 once retaining ring 18 is snapped into place. As such, probe head 12 and strut 14 are axially locked in place prior to brazing, but still maintain rotational freedom. Further, exterior groove 38 and interior groove 44 are positioned along probe head 12 and strut 14, respectively, such that probe head 12 will lock into a proper axial position within strut 14. Because interior groove 44 has square edges, retaining ring 18 is locked into interior groove 44 and probe head 12 is not removable from, or is permanently attached to, strut 14. However, probe head 12 is still rotatable within strut socket 40.

Traditionally, during manufacturing, the probe head of an air data probe is inserted into the strut and the probe head and strut are manually held in place while being brazed together. Retaining ring 18, exterior groove 38, and interior groove 44 are dimensioned and positioned such that retaining ring 18 mechanically locks probe head 14 to strut 12 at a precise and proper axial position, while still allowing rotational freedom, prior to brazing. Proper positioning of probe head 14 within strut 12 is important for sizing gap 26. If gap 26 is too small or too wide, it is difficult to get braze material to flow into gap 26. Positioning probe head 12 properly within strut 14 sets gap 26 to a precise and proper size. Snapping retaining ring 18 into place is also a quick and easy method for securely positioning probe head 12 and strut 14. Once retaining ring 18 snaps into place, probe head 12 and strut 14 can be brazed without having to hold probe head 12 and strut 14 together, and movement of probe head 12 within strut 14 prior to or during the brazing process can be avoided. Additionally, providing a mechanical connection, or lock, between probe head 12 and strut 14 ensures probe head 12 and strut 14 will stay in place even if the braze were to re-flow. Further, because probe head 12 and strut 14 are brazed and mechanically connected, the joint between probe head 12 and strut 14 is stronger than if the probe head and the strut were just brazed together.

Figure 3:
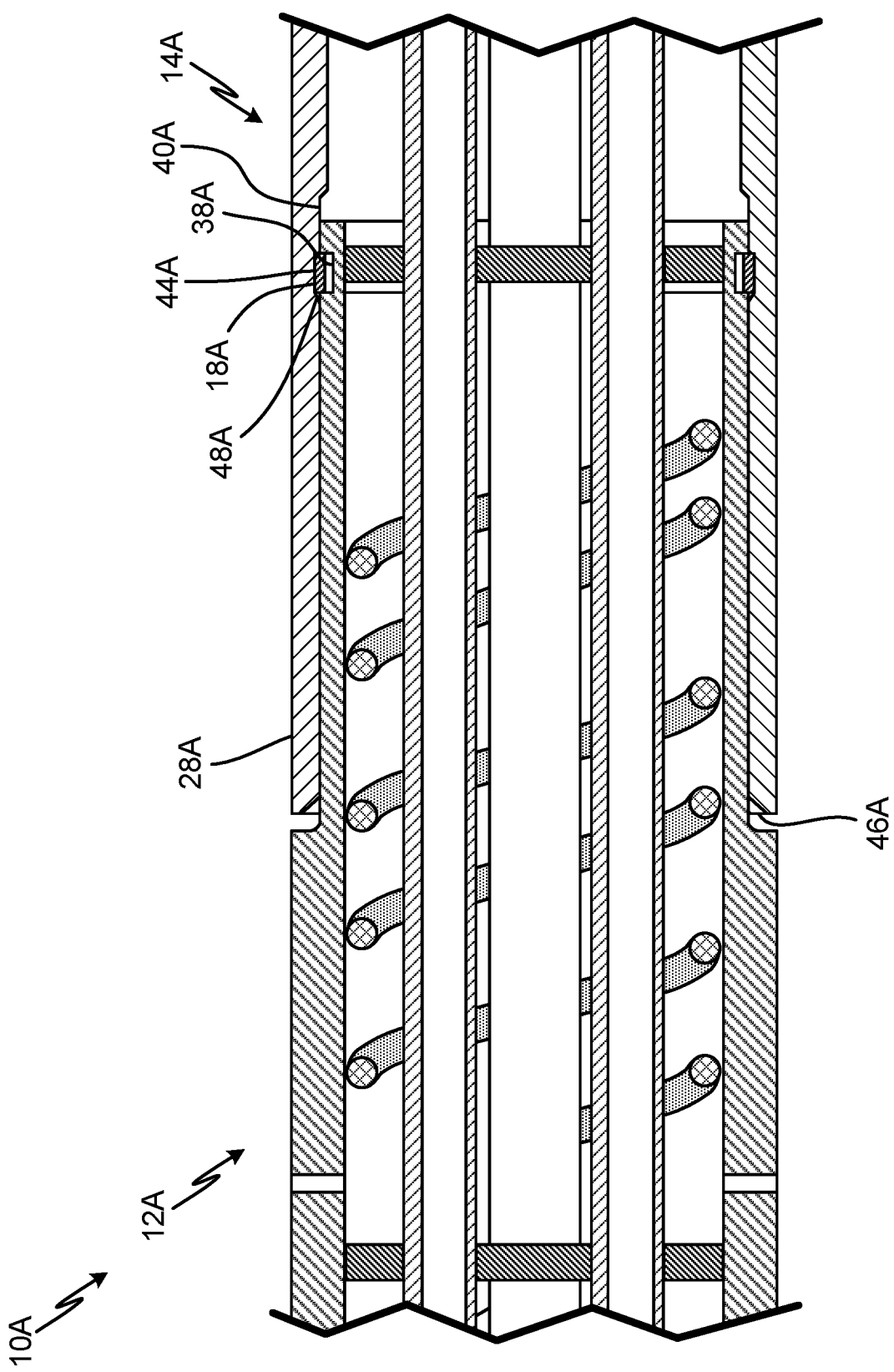
FIG. 3 is a partial cross-sectional view of the probe head fully inserted into the strut of the air data probe showing a second embodiment of an interior groove.

FIG. 3 is a partial cross-sectional view of probe head 12A fully inserted into strut 14A of air data probe 10A showing a second embodiment of interior groove 44A. Air data probe 10A includes probe head 12A, strut 14A, retaining ring 18A, and passageway 28A. Probe head 12A includes exterior groove 38A. Strut 14A includes strut socket 40A, interior groove 44A, and tapered edge 46A. Interior groove 44A includes tapered edge 48A.

Air data probe 10A has the same structure as described in reference to air data probe 10 in FIGS. 1, 2A, 2B, and 2C except that interior groove 44A does not have a square-shaped cross-sectional profile and square edges. Interior groove 44A has tapered edge 48A. Tapered edge 48A is an edge of interior groove 44A closer to tapered edge 46A, and is angled, or tapered, such that interior groove 44A has a trapezoid-shaped cross-sectional profile. The other edge of interior groove 44A has a square edge.

If probe head 12A is pulled out of, or away from, strut 14A, tapered edge 48A of interior groove 44A will cause retaining ring 18A in interior groove 44A to begin to compress. The force required to compress retaining ring 18A and pull probe head 12A out of strut will depend on the angle of tapered edge 48A. A lesser angled tapered edge 48A requires more force to removed probe head 12A, and a greater angled tapered edge 48A requires less force to remove probe head 12A. As probe head 12 is pulled further away from strut, retaining ring 18A will fully compress into exterior groove 38A. Tapered edge 48A is sized and shaped to cause retaining ring 18A to radially compress an amount sufficient to allow probe head 12A to be withdrawn from socket 14A in response to axial loading of probe head 12 relative to strut 14A. As such, probe head 12 can be pulled out of strut socket 40A of strut 14A. Therefore, probe head 12A is removable from strut 14A. Probe head 12A may be removed or exchanged for another probe head during the manufacturing process.

Discussion of Possible Embodiments

The following are non-exclusive descriptions of possible embodiments of the present invention.

An air data probe includes a strut including: a socket defining an interior surface of the strut; and an interior groove extending radially into the interior surface; a probe head partially positioned within the socket, the probe head including: an exterior surface; and an exterior groove extending radially into the exterior surface, the exterior groove being axially alignable with the interior groove; and a retaining ring being partially positionable within the exterior groove and partially positionable within the interior groove when the exterior groove and the interior groove are axially aligned to axially retain the probe head to the strut while allowing the probe head to rotate relative to the strut.

The air data probe of the preceding paragraph can optionally include, additionally and/or alternatively, any one or more of the following features, configurations and/or additional components:

Axial dimensions of the retaining ring, the exterior groove, and the interior groove are sized and configured to allow some axial movement between the probe head and the strut.

The strut includes a tapered edge at an end of the socket that receives the probe head.

The tapered edge is configured to radially compress the retaining ring into the exterior groove of the probe head as the probe head is inserted into the socket.

The interior groove has a square edge.

The interior groove has a tapered edge sized and configured to cause the retaining ring to radially compress an amount sufficient to allow the probe head to be withdrawn from the socket in response to axial loading of the probe head relative to the strut.

An annular gap defined between the probe head and the strut can be filled with brazing material to allow the probe head to be brazed to the strut.

The retaining ring can compress radially from its free state.

The exterior groove in the probe head is dimensioned to allow the retaining ring to compress radially until the retaining ring is fully positioned within the exterior groove.

A radially outer surface of the retaining ring is about flush with an exterior surface of the probe head when the retaining ring is fully positioned within the exterior groove.

A housing connected to the strut.

The air data probe further includes: a heater positioned within a hollow portion of the probe head; a pneumatic tube positioned within the hollow portion of the probe head; and a bulkhead positioned within the hollow portion of the probe head.

A method for manufacturing an air data probe includes inserting a probe head into a socket of a strut; radially compressing a retaining ring positioned at an exterior groove of the probe head; aligning the exterior groove with an interior groove in the socket of the strut; radially expanding the retaining ring so that a portion of the retaining ring is positioned within the interior groove and a portion of the retaining ring is positioned within the exterior groove; locking the probe head to the strut; positioning a braze material in an annular gap defined between the probe head and the strut; and fixing the probe head to the strut.

The method of the preceding paragraph can optionally include, additionally and/or alternatively, any one or more of the following features, configurations and/or additional components:

The retaining ring is partially positioned in the exterior groove of the probe head and partially positioned in the interior groove of the strut when the retaining ring expands.

Positioning the braze material in the annular gap includes filling the exterior groove of the probe head and the interior groove of the strut with the braze material.

Fixing the probe head to the strut includes brazing the probe head to the strut to join the probe head to the strut in a final position such that the probe head is permanently bonded to the strut.

The retaining ring is radially compressed at a tapered edge of the strut.

The retaining ring is compressed such that the retaining ring is fully positioned within the exterior groove of the probe head.

Adjusting the probe head within the strut by rotating the probe head relative to the strut prior to fixing the probe head to the strut.

Adjusting the probe head within the strut by axially adjusting the probe head relative to the strut prior to fixing the probe head to the strut.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data probe comprising:
   a strut including:
      a socket defining an interior surface of the strut; and
      an interior groove extending radially into the interior surface;
   a probe head partially positioned within the socket, the probe head including:
      an exterior surface; and
      an exterior groove extending radially into the exterior surface, the exterior groove being axially alignable with the interior groove; and
   a retaining ring being partially positioned within the exterior groove and partially positioned within the interior groove, when the exterior groove and the interior groove are axially aligned, to retain the probe head to the strut while allowing the probe head to rotate relative to the strut.

2. The air data probe of claim 1, wherein axial dimensions of the retaining ring, the exterior groove, and the interior groove are sized and configured to allow some axial movement between the probe head and the strut.

3. The air data probe of claim 1, wherein the strut includes a tapered edge at an end of the socket that receives the probe head.

4. The air data probe of claim 3, wherein the tapered edge is configured to radially compress the retaining ring into the exterior groove of the probe head as the probe head is inserted into the socket.

5. The air data probe of claim 1, wherein the interior groove has a square edge.

6. The air data probe of claim 1, wherein the interior groove has a tapered edge sized and configured to cause the retaining ring to radially compress an amount sufficient to allow the probe head to be withdrawn from the socket in response to axial loading of the probe head relative to the strut.

7. The air data probe of claim 1, wherein an annular gap defined between the probe head and the strut is configured to be filled with brazing material to allow the probe head to be brazed to the strut.

8. The air data probe of claim 1, wherein the retaining ring can compress radially from its free state.

9. The air data probe of claim 1, wherein the exterior groove in the probe head is dimensioned to allow the retaining ring to compress radially until the retaining ring is fully positioned within the exterior groove.

10. The air data probe of claim 9, wherein a radially outer surface of the retaining ring is about flush with an exterior surface of the probe head when the retaining ring is fully positioned within the exterior groove.

11. The air data probe of claim 1, and further including a housing connected to the strut.

12. The air data probe of claim 1, wherein the air data probe further includes:
   a heater positioned within a hollow portion of the probe head;
   a pneumatic tube positioned within the hollow portion of the probe head; and
   a bulkhead positioned within the hollow portion of the probe head.

13. A method for manufacturing an air data probe comprising:
   inserting a probe head into a socket of a strut;
   radially compressing a retaining ring positioned at an exterior groove of the probe head;
   aligning the exterior groove with an interior groove in the socket of the strut;
   radially expanding the retaining ring so that a portion of the retaining ring is positioned within the interior groove and a portion of the retaining ring is positioned within the exterior groove;
   locking the probe head to the strut;

positioning a braze material in an annular gap defined between the probe head and the strut; and fixing the probe head to the strut.

14. The method of claim 13, wherein the retaining ring is partially positioned in the exterior groove of the probe head and partially positioned in the interior groove of the strut when the retaining ring expands.

15. The method of claim 13, wherein positioning the braze material in the annular gap includes filling the exterior groove of the probe head and the interior groove of the strut with the braze material.

16. The method of claim 13, wherein fixing the probe head to the strut includes brazing the probe head to the strut to join the probe head to the strut in a final position such that the probe head is permanently bonded to the strut.

17. The method of claim 13, wherein the retaining ring is radially compressed at a tapered edge of the strut.

18. The method of claim 13, wherein the retaining ring is compressed such that the retaining ring is fully positioned within the exterior groove of the probe head.

19. The method of claim 13, further including adjusting the probe head within the strut by rotating the probe head relative to the strut prior to fixing the probe head to the strut.

20. The method of claim 13, further including adjusting the probe head within the strut by axially adjusting the probe head relative to the strut prior to fixing the probe head to the strut.

* * * * *